United States Patent [19]
Raciti

[11] Patent Number: 4,972,173
[45] Date of Patent: Nov. 20, 1990

[54] OPTICAL DEVICE ON THE DOORS OF MOTOR VEHICLES TO SHOW THEY ARE OPEN AND TO ILLUMINATE THE ZONE BETWEEN DOOR AND VEHICLE

[76] Inventor: Maurizio Raciti, Via Leonardo da Vinci, 196, 90145 Palermo, Italy

[21] Appl. No.: 362,395

[22] PCT Filed: Nov. 11, 1987

[86] PCT No.: PCT/IT87/00093
§ 371 Date: May 26, 1989
§ 102(e) Date: May 26, 1989

[87] PCT Pub. No.: WO88/04243
PCT Pub. Date: Jun. 16, 1988

[30] Foreign Application Priority Data
Dec. 10, 1986 [IT] Italy ................................ 42011 A/86

[51] Int. Cl.⁵ ........................................ B60Q 1/26
[52] U.S. Cl. .................................. 340/472; 340/468; 362/61
[58] Field of Search ............... 362/80, 94, 83.3, 61; 340/471, 472, 468, 425.5; 315/84

[56] References Cited
U.S. PATENT DOCUMENTS

| | | | |
|---|---|---|---|
| 1,416,467 | 5/1922 | Hobbs | 362/80 |
| 2,901,593 | 8/1959 | McNally | 362/94 X |
| 2,918,565 | 12/1959 | Vermette | 362/94 X |
| 3,452,190 | 6/1969 | Senseman | 362/80 |

FOREIGN PATENT DOCUMENTS
1412309 10/1984 France .

Primary Examiner—Joseph A. Orsino
Assistant Examiner—Brian R. Tumm
Attorney, Agent, or Firm—Michael J. Striker

[57] ABSTRACT

Optic device (10) to be mounted on the inner side (13) of doors (12) of motor vehicles comprising at least two light diffusers, one for a warning light (15) directed towards the back of the vehicle (11) and upwards and the other for illumination (16) directed downwards and towards the back of the vehicle (11) so that the door (12) being open, and its position are clearly seen by vehicles arriving from behind while at the same time the area (40) of ground comprised between the door (12) and the vehicle (11) is lit up assisting passengers to alight from inside (38) the vehicle.

5 Claims, 3 Drawing Sheets

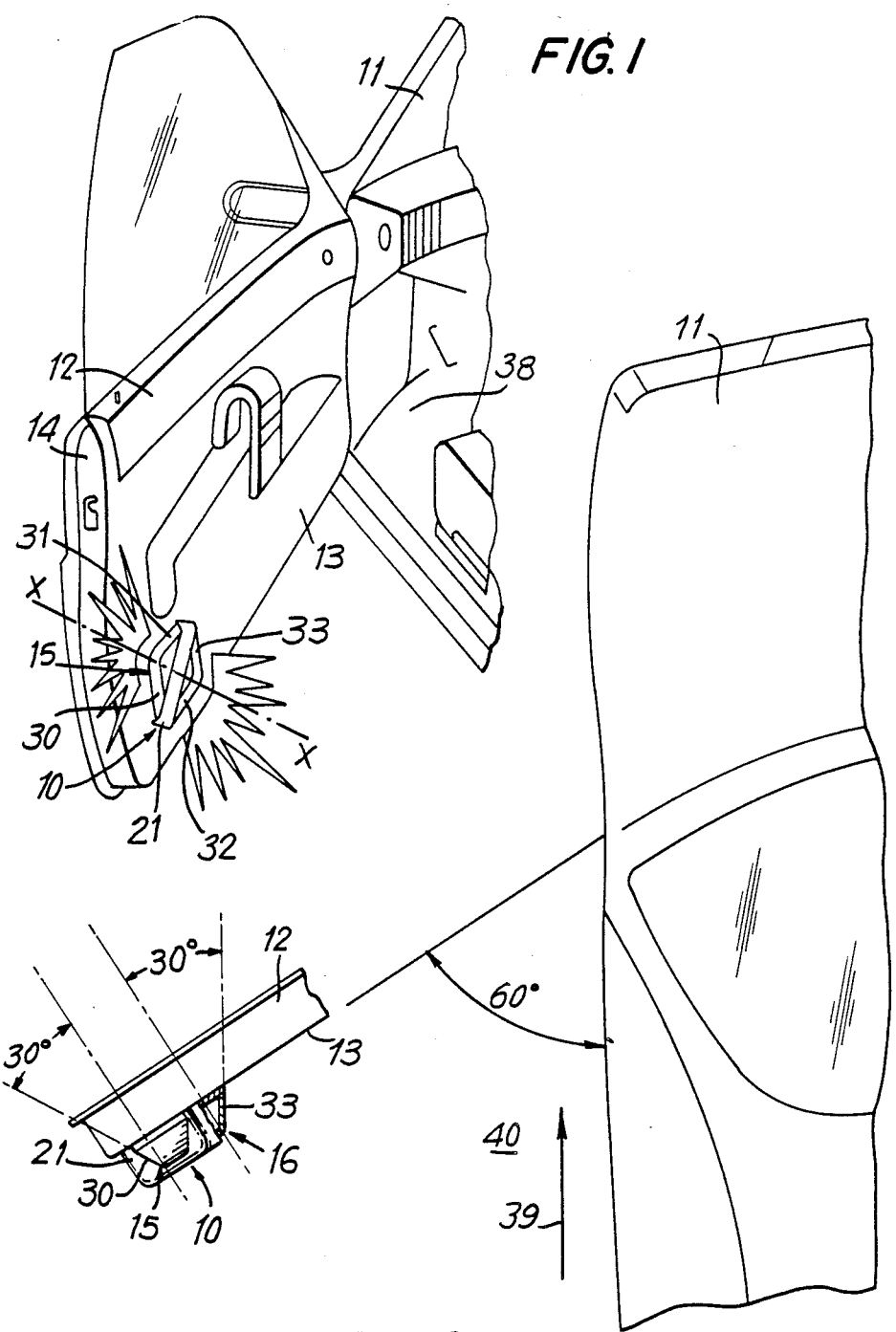

OPTICAL DEVICE ON THE DOORS OF MOTOR VEHICLES TO SHOW THEY ARE OPEN AND TO ILLUMINATE THE ZONE BETWEEN DOOR AND VEHICLE

BACKGROUND OF THE INVENTION

Safety is one of the basic features for a motor vehicle and light represents the most elementary but essential means for improving it especially where daylight is lacking.

It is necessary to see well and be seen for safe driving but also to make the act of driving more relaxing.

Light-emitting or reflecting devices exist on motor vehicles to indicate the bulk and presence of certain projecting structures. The accessories included in this category are those placed on the back edge of the door to enable drivers arriving from behind to see the open door, an example being the red light that comes on automatically when the door is opened or merely a reflector that returns the light to its source when struck by the lights of a vehicle coming up behind.

The reference U.S. patent application Ser. No. 3,452,190 discloses a visual device for the doors of motor vehicles comprising a lamp that lights up a coloured disc placed on the side face of the device.

The lamp sends its light down through a lower aperture in a kind of box to be mounted on the door of the vehicle.

On opening the door the coloured disc warns approaching vehicles of the open door of the stationary vehicle, while the downward directed white light illuminates the piece of ground between the vehicle and its door facilitating entry and exit into and from the vehicle by users.

The reference patent FR -1 412 309 also discloses a visual device the effects of which are practically same as those of the first described patent.

By means of a red diffuser, the light from a lamp shines both perpendicularly to the door, and at an angle to said door on the horizontal plane.

Light from the lamp is directed onto the ground through a lower aperture in an opaque cover over the lamp.

The advantage of this device is that it warns approaching vehicles that the door of the stationary vehicle is open and also indicates it position.

Further, the space between door and vehicle is illuminated. Visibility of the warning red light is however limited, it being directed only onto planes that are substantially horizontal, while effectiveness of the white light shining to facilitate movement in and out of the vehicle is greatly limited being directed exclusively to an area right close to the door.

On the other hand, any widening of the aperture through which the light reaches the ground might create beams that are too bright and might even endanger approaching vehicles.

SUMMARY OF THE INVENTION

The invention described in the present patent application gives a more powerful warning of the open door and of its position as well as giving good illumination both of the area of ground between door and vehicle and also of the space created by the opening of the door, but without causing any annoyance to approaching vehicles as will here be described.

The visual device, subject of the present patent application comprises a warning light diffuser whose light is coloured, having a flat face inclined at about 30° in relation to the plane of the side of the door towards the front of the vehicle, and an illumination diffuser with a flat face inclined at about 30° in relation to the plane of the side of the door towards the rear of the vehicle.

In the case of the illuminating diffuser one face is directed towards the front of the vehicle and the other towards the ground, light being emitted both downwards and towards the front of the vehicle, as well as towards the space left free by the door being open. Preferably the warning light is red and the illuminating light is white.

Said optical device comprises a tubular lamp placed at 90° in relation to the common geometrical axis of the two diffusers and at the center of said axis, or else comprises one lamp for the warning diffuser and one for the illuminating diffuser with joint or separate lighting controls.

Preferably said optical device lights up automatically when the door is opened. In one type of execution the warning diffuser consists of a reflector.

There may also be more than two diffusers of various shapes with the light diffusing surfaces set at various inclinations. The advantages offered by the invention are evident. The diffuser of the red warning light directs its light not only towards the rear of the vehicle, and therefore towards the approaching vehicles, but also upwards and in directions intermediate between the first two mentioned.

When the door is fully opened, the diffuser lies transversally to the direction of approaching vehicles. In this way the open door and its position are powerfully indicated.

The illuminating diffuser emits white light not only in a downward direction but also towards the rear of the vehicle, also lighting up its side, namely the space created by the opening of the door. When the door is fully opened, the latter diffuser lies parallel to the side of the vehicle. Therefore, not only is said white light diffuser hidden from approaching vehicles, but it also amply illuminates both the area of ground between door and vehicle and also the side of said vehicle assisting travelers to enter and leave it after dark.

Characteristics and scope of the invention will be made even clearer by the following example of its execution illustrated diagrammatic drawings.

BRIEF DESCRIPTION OF THE DRAWING

FIG. 1. Detail of a motor vehicle with a door open on which is mounted the optic device, subject of the invention, seen from the back;

FIG. 2. The same as FIG. 1 seen from above;

FIG. 4. Detail of the view in FIG. 3, cut through;

DETAILED DESCRIPTION OF THE PREFERRED EMBODIMENT

Figure 3:
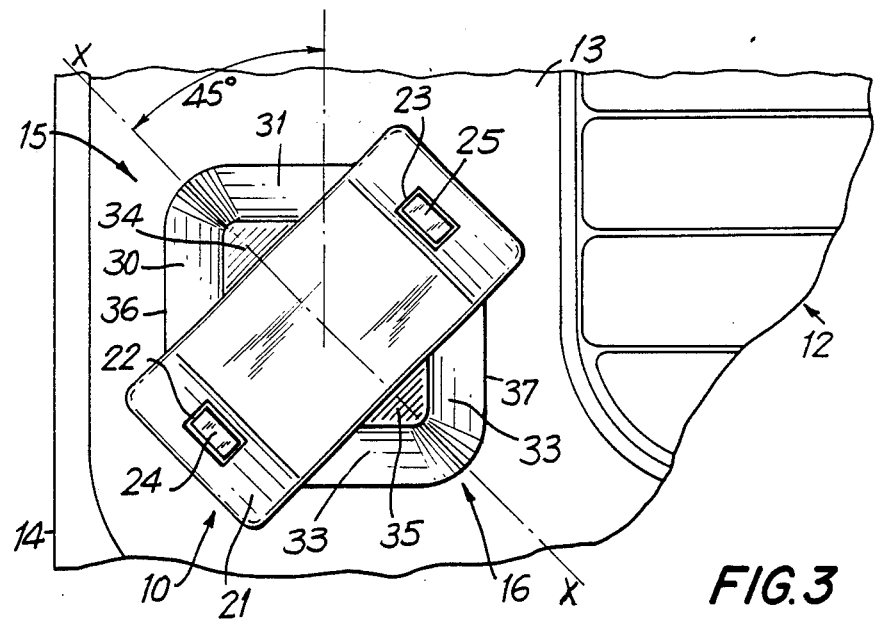
FIG. 3. Detail of the inner side of the door with the optic device mounted on it, seen from the front.
Figure 4:
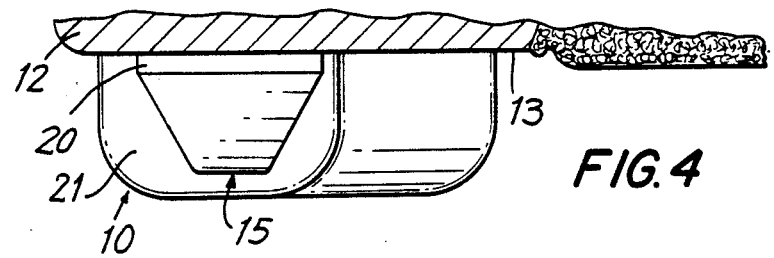
Figure 5:
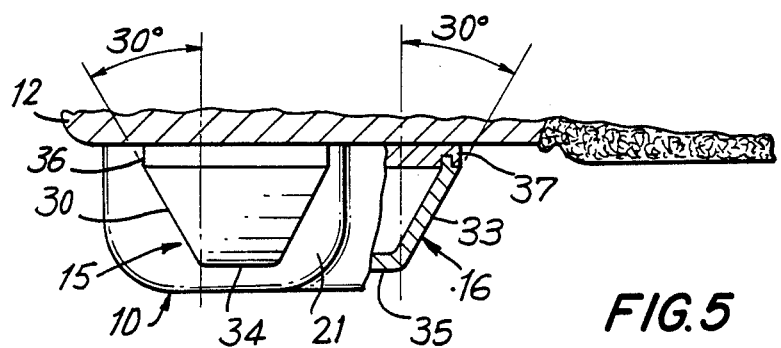
FIG. 5. Detail of the FIG. 4 with a part cut away to show the lower diffuser.

The optic device 10 placed on the inner side 13 of the door 12 of the motor vehicle 11 presents, near the back edge 14, the light diffusers 15, 16 facing the opposite way and aligned on the XX axis at 45° in relation to vertical.

Figure 6:
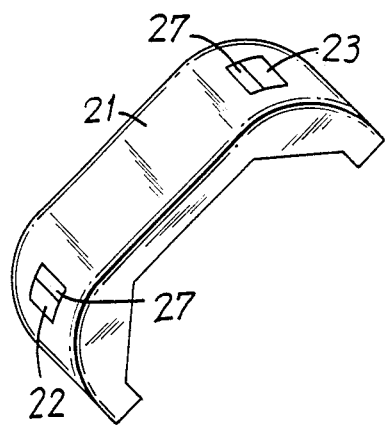
FIG. 6. Perspective of the transversal cover of the optic device, between the two diffusers.
Figure 7:
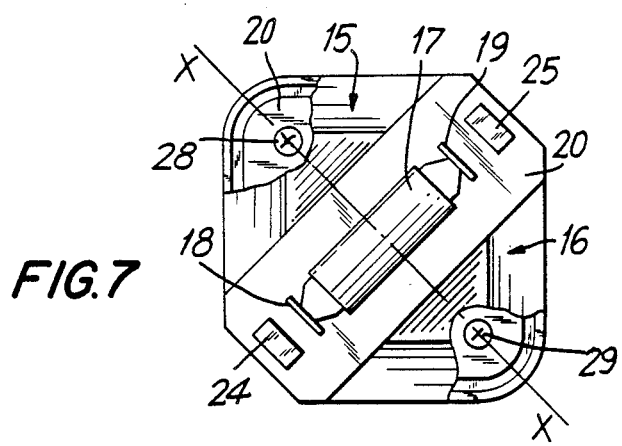
FIG. 7. Plan view of the base of the device.
Figure 8:
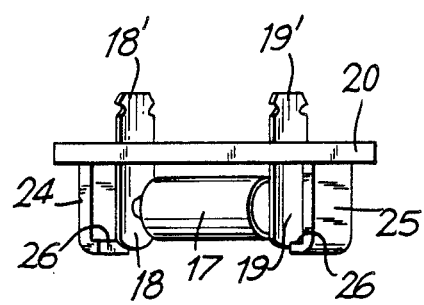
FIG. 8. Profile view of the base of the device.

Inside the device (FIGS. 6-8) the tubular lamp 17 is mounted perpendicular to the XX axis above, between the two elastic contacts 18, 19 fixed to the base 20 and projecting from the bace of said base forming the projecting ends 18′,19′ for connection to the vehicle's electric circuit. The base 20 can be fixed to the side 13 of the door by screws 28, 29.

The diffusers 15, 16 are held firmly to the base 20 by the arched transversal cover 21 with its holes 22, 23 into which penetrate the eleastic tongues 24,25 fixed to the base 20. The teeth 26 (FIG. 8) of said tongues grip onto the reliefs 27 made on the inside of said holes.

The flat side 30 of the red angular warning diffuser 15 faces towards the back of the vehicle and the flat side 31 faces upwards, while the flat side 32 of the white angular illuminating diffuser 16 faces downwards and the flat side 33 faces towards the front of the vehicle.

As FIGS. 1-5 clearly show, the angle of said sides 30, 31, 32, 33, to a plane at right angles to the side 13 of the door 12 is practically an angle of 30°.

ThereforE when the door is open half way of its maximum, presumed to be 60°, the flat side 30 with the red warning light of the diffuser 15 is practically perpendicular to the vehicle's direction of movement indicated (FIG. 2) by the arrow 39 accentuating effectiveness of the warning.

When the door is open to maximum, the flat side 33 with the white illuminating light of the diffuser 16 lies practically parallel to the direction 39 of vehicle movement and its direct visibility by vehicles approaching from the bace is practically prevented.

Without lessening the safety of the vehicle, therefore, the diffuser 16 lights up the zone 40 of the ground comprised between the vehicle and its open door, facilitating exit from the inside of said vehicle 38.

The device 10 here described can also serve other purposes and can be varingly composed and shaped. For example, if mounted with two diffusers of the same colour, it can be fitted to the middle of the ceiling of the vehicle to project two separate light beams front and back. The device can also be mounted on the inside of the door by other means such as a snap-in fixture or using glue or by other methods.

The advantages of the invention are evident. Any vehicle can be fitted with two lighting systems to promote safety and comfort by means of a single element that can be universally mounted on each door. Opening the door is made such safer at the same time facilitating exit from the vehicle where environmental lighting is lacking.

Due to the original composition and shape of the optic device described, illumination of the zone between the open door and the vehicle is of great convenience to travelers while in no way diminishing the safety offered by the red warning light fully visible to vehicles approaching from behind. All this is achieved by a means at once simple, inexpensive and easily mounted.

I claim:

1. An optical device to be mounted on an inner side surface of a door of a motor vehicle for automatic lighting up upon opening of the door to indicate an open position of the door and to assist entry and exit from the vehicle, said device comprising a first position-warning colored light diffuser having a first flat vertical surface facing a back portion of the vehicle and inclined, in a closed position of the door, to a front portion of the vehicle at an angle of substantially 30° in relation to a direction perpendicular to the door of the vehicle, and a second illuminating light diffuser having a second flat vertical surface facing the front portion of the vehicle and inclined, in the closed position of the door, to the back portion of the vehicle at an angle of substantially 30° in relation to the direction perpendicular to the door of the vehicle, whereby upon opening of the door to an aperture of substantially 30° that corresponds to substantially a half of a full opening aperture of the door, said first flat vertical surface is substantially perpendicular to a longitudinal axis of the vehicle so that position-warning colored light is visible to approaching vehicles, and upon full opening of the door, said second flat vertical surface is substantially parallel to the longitudinal axis of the vehicle so that illuminating light is hidden from the approaching vehicles while illuminating a side of the vehicle.

2. An optical device as set forth in claim 1, wherein the position warning light is red, and the illuminating light is white.

3. An optical device as set forth in claim 1, wherein said optical device has a shape of a tetrahedral truncated pyramid having a base and four lateral faces inclined at an angle of substantially 30° to said base, said first two adjacent lateral faces of said pyramid defining said first flat vertical surface of said position-warning colored light diffuser and another surface of said position-warning colored light diffuser facing upward, said two second adjacent lateral faces of said pyramid defining said second flat vertical surface of said illuminating light diffuser and another surface of said illuminating light diffuser directed downward whereby said position-warning colored light diffuser provides for emission of the position-warning colored light towards the back portion of the vehicle in upward and intermediate directions providing maximum visibility to the approaching vehicles, and said illuminating light diffuser provides for emission of the illuminating light towards the front portion of the vehicle and downwards lighting up ground near the vehicle door.

4. An optical device as set forth in claim 3, further comprising an internal tubular lamp arranged centrally on an axis extending at a 45° angle to the axes of said first and second diffusers.

5. An optical device as set forth in claim 3, further comprising a substantially rectangular cover overlying said truncated pyramid and extending diagonally over two opposite edges thereof that separate said two first adjacent lateral faces and said two second adjacent lateral surfaces.

* * * * *